(12) United States Patent
Rael

(10) Patent No.: US 7,457,380 B2
(45) Date of Patent: Nov. 25, 2008

(54) LOW NOISE CIRCUIT AND APPLICATIONS THEREOF

(75) Inventor: Jacob Rael, Los Angeles, CA (US)

(73) Assignee: Broadcom Corporation, Irvine, CA (US)

( * ) Notice: Subject to any disclaimer, the term of this patent is extended or adjusted under 35 U.S.C. 154(b) by 688 days.

(21) Appl. No.: 10/958,446

(22) Filed: Oct. 5, 2004

(65) Prior Publication Data

US 2005/0286662 A1    Dec. 29, 2005

Related U.S. Application Data

(60) Provisional application No. 60/583,491, filed on Jun. 28, 2004.

(51) Int. Cl.
*H03D 1/04* (2006.01)
(52) U.S. Cl. ..................... 375/346
(58) Field of Classification Search .............. 375/346, 375/142, 143, 144, 148, 150, 152, 316, 343, 375/226; 455/63.1, 114.2, 278.1, 296; 370/516; 702/69; 348/497
See application file for complete search history.

(56) References Cited

U.S. PATENT DOCUMENTS

| | | | | |
|---|---|---|---|---|
| 5,138,203 A * | 8/1992 | Ono et al. | 327/382 |
| 5,912,596 A * | 6/1999 | Ghoshal | 331/117 R |
| 5,963,856 A * | 10/1999 | Kim | 455/307 |
| 6,396,316 B1 * | 5/2002 | Cruz et al. | 327/112 |
| 2002/0101284 A1 * | 8/2002 | Kee et al. | 330/251 |
| 2002/0105384 A1 * | 8/2002 | Dent | 330/302 |
| 2004/0224658 A1 * | 11/2004 | Borremans | 455/323 |

* cited by examiner

*Primary Examiner*—Sam K Ahn
(74) *Attorney, Agent, or Firm*—Garlick Harrison & Markison; Timothy W. Markison; Kevin L. Smith

(57) ABSTRACT

A low noise circuit includes a clocked circuit and an impedance trap circuit. The clocked circuit includes a clock input, an input, an output, a power supply connection, and a power return connection. The clock input is operably coupled to receive a clock signal. The clocked circuit provides an output signal at the output based on an input signal at the input and a transition of the clock signal. The power supply connection is operably coupled to a power supply and the power return is operably coupled to a circuit ground. The impedance trap circuit is operably coupled to the power supply connection and the power return connection, wherein the impedance trap circuit attenuates a harmonic signal component of at least one of the input signal, the clock signal, and the output signal.

14 Claims, 6 Drawing Sheets low noise circuit 110 low noise circuit 110 impedance trap circuit 120 impedance trap circuit 120 impedance trap circuit 120

LOW NOISE CIRCUIT AND APPLICATIONS THEREOF

This invention is claiming priority under 35 USC § 119(e) to a provisionally filed patent application having the same title as the present patent application, a filing date of Jun. 28, 2004, and an application Ser. No. of 60/583,491.

BACKGROUND OF THE INVENTION

1. Technical Field of the Invention

This invention relates generally to mixed signal circuits and more particularly to noise suppression of such mixed signals circuits.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, an analog to digital conversion stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The analog to digital conversion stage converts the analog filtered signals into digital signals. The data recovery stage recovers raw data from the digital signals in accordance with the particular wireless communication standard.

As is further known, the signal strength of inbound RF signals may vary from 10 dB to -90 dB. For the weaker inbound signals, having as large of a signal to noise ratio as possible enables the receiver to more accurately recover data embedded in the RF signals. As such, any circuitry of the transceiver that generates noise adversely affects the sensitivity of the receiver (i.e., the ability to accurately recover data from low signal strength inbound RF signals).

One source of noise in the transceiver is a clock that generates a digital clock that is used by many of the digital circuits within the transceiver. For example, the digital clock may be an 80 MHz clock that is used by the data recovery stage, the data modulation stage, the analog to digital conversion stage, etc. Such a digital clock generates harmonic tones at multiples of the fundamental frequency (e.g., 80 MHz). where at least one of the harmonic tones has a frequency at or near the frequency of the inbound RF signals. For instance, if the inbound RF signals have a frequency of 2.4 GHz, the $30^{th}$ harmonic tone of the 80 MHz clock has a frequency at 2.4 GHz. Such harmonic tones are carried on the power supply lines of the transceiver and coupled into noise sensitive circuits of the receiver.

Typically, to minimize the energy of the harmonic tones of the digital clock, a large capacitor is coupled on the power supply lines of the digital clock circuit (e.g., from $V_{DD}$ to $V_{SS}$). In addition, many of the noise sensitive circuits, such at the analog input circuitry of the analog to digital conversion stage will include large capacitors on its power supply lines to minimize the noise coupled thereon. While this helps minimize the noise on the power supply lines, the die size of the capacitors is significant, which adds to the cost of manufacturing radio frequency integrated circuits.

Therefore, a need exists for a method and apparatus of reducing noise associated with harmonic tones of digital circuitry using minimal sized components.

BRIEF SUMMARY OF THE INVENTION

The low noise circuit of the present invention substantially meets these needs and others. In one embodiment, a low noise circuit includes a clocked circuit and an impedance trap circuit. The clocked circuit includes a clock input, an input, an output, a power supply connection, and a power return connection. The clock input is operably coupled to receive a clock signal. The clocked circuit provides an output signal at the output based on an input signal at the input and a transition of the clock signal. The power supply connection is operably coupled to a power supply and the power return is operably coupled to a circuit ground. The impedance trap circuit is operably coupled to the power supply connection and the power return connection, wherein the impedance trap circuit attenuates a harmonic signal component of at least one of the input signal, the clock signal, and the output signal.

In another embodiment, a radio frequency (RF) receiver includes a low noise amplifier, a down conversion module, an analog to digital conversion module, a baseband processing module, and an impedance trap circuit. The low noise amplifier is operably coupled to amplify inbound RF signals to produce amplified inbound RF signals. The down conversion module is operably coupled to convert the amplified inbound RF signals into inbound baseband signals based on a local oscillation. The analog to digital conversion module is operably coupled to convert the inbound baseband signals into digital baseband signals. The baseband processing module is operably coupled to convert the digital baseband signals into inbound data, wherein the baseband processing module is clocked by a digital clock. The impedance trap circuit is operably coupled to a power supply connection and a power return connection of the analog to digital conversion module, wherein the impedance trap circuit attenuates a harmonic signal component of the digital clock, wherein the harmonic signal component is in a frequency range of the inbound RF signals.

In yet another embodiment, a radio frequency integrated circuit (RFIC) includes a receiver section, a transmitter section, a local oscillation generation module, a baseband processing module, a digital clock circuit, and an impedance trap circuit. The receiver section is operably coupled to convert inbound radio frequency (RF) signals into inbound digital baseband signals based on a receiver local oscillation. The transmitter section is operably coupled to convert outbound digital baseband signals into outbound RF signals based on a transmitter local oscillation. The local oscillation generation module is operably coupled to produce the receiver local oscillation and the transmitter local oscillation. The baseband processing module is operably coupled to convert the inbound digital baseband signals into inbound data and to convert outbound data into the outbound digital baseband signals, wherein the baseband processing module is clocked by a digital clock. The digital clock circuit is operably coupled to produce the digital clock from a reference clock signal. The impedance trap circuit is operably coupled to a power supply connection and a power return connection of the digital clock circuit, wherein the impedance trap circuit attenuates a harmonic signal component of the digital clock, wherein the harmonic signal component is in a frequency range of the inbound RF signals and the outbound RF signals.

DETAILED DESCRIPTION OF THE INVENTION

Figure 1:
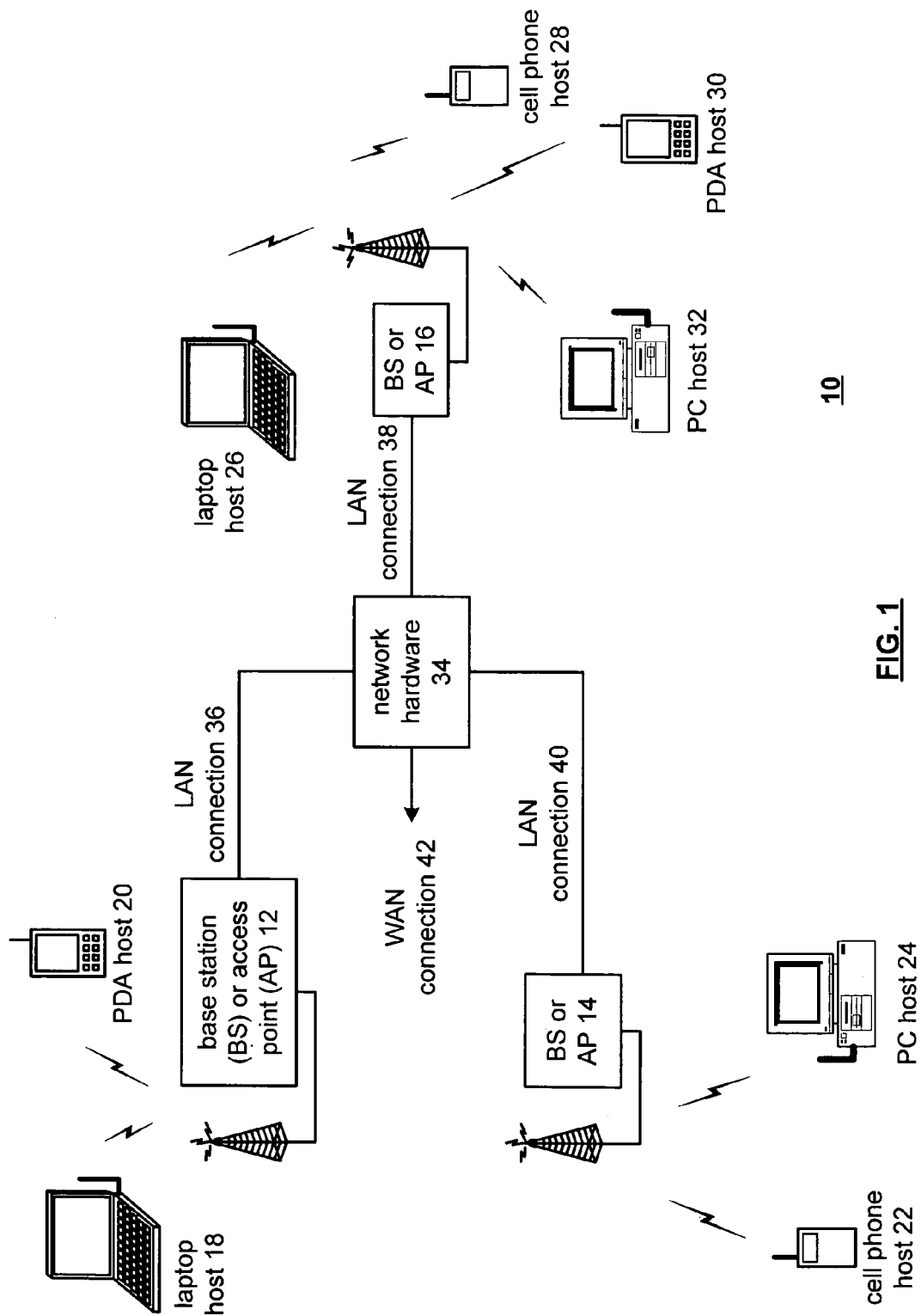
FIG. 1 is a schematic block diagram of a wireless communication system in accordance with the present invention.

FIG. 1 is a schematic block diagram illustrating a communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio.

Figure 2:
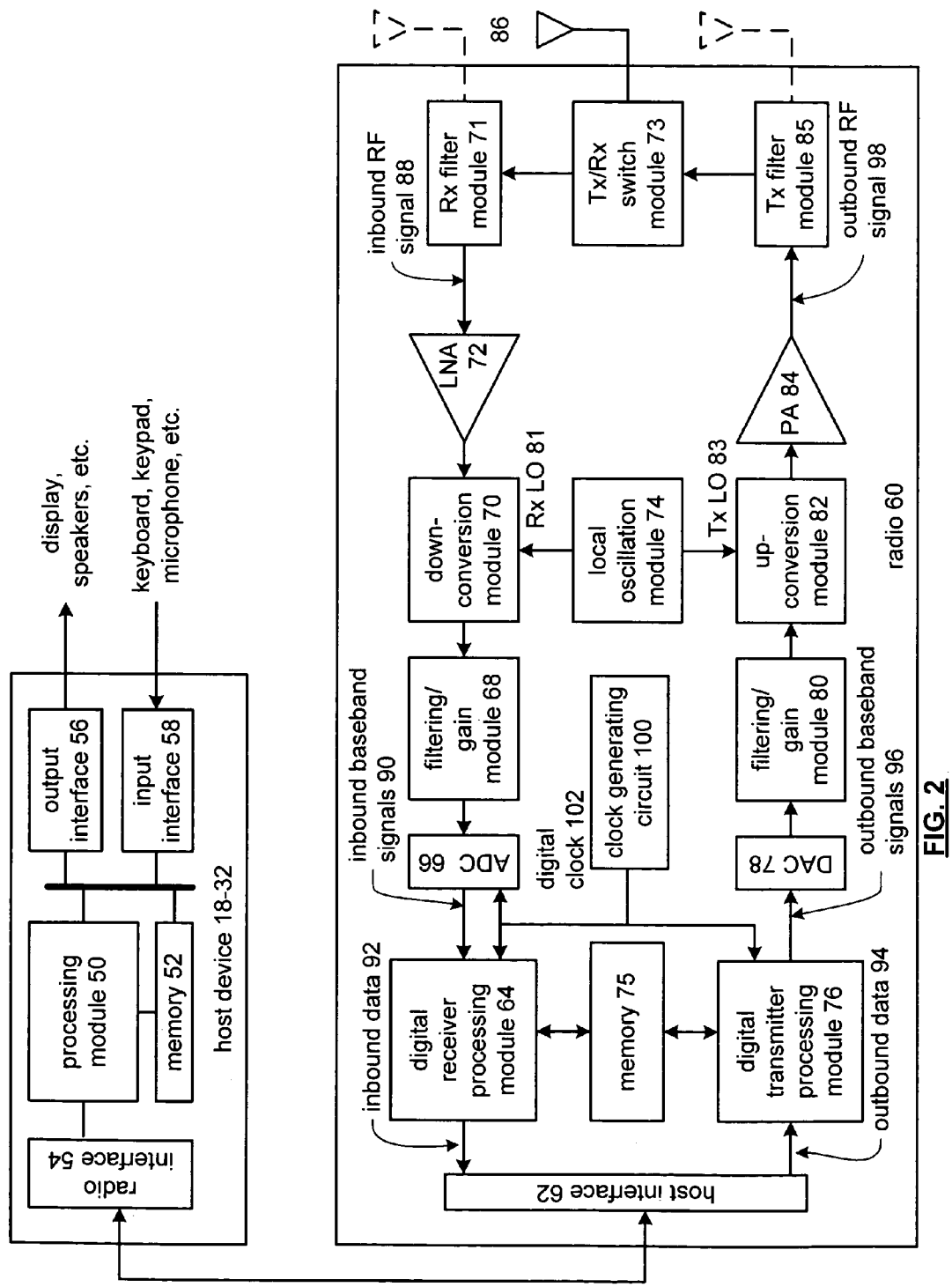
FIG. 2 is a schematic block diagram of a wireless communication device in accordance with the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, a radio interface 54, an input interface 58, and an output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a filtering/gain module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter 78, a filtering/gain module 80, an IF mixing up conversion stage 82, a power amplifier 84, a transmitter filter module 85, an antenna 86, and a clock generating circuit 100. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 are clocked by the digital clock 102 and may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11, Bluetooth, et cetera) to produce outbound baseband signals 96. The outbound baseband signals 96 will be digital base-band signals (e.g., have a zero IF) or a digital low IF signals, where the low IF typically will be in the frequency range of one hundred kilohertz to a few megahertz.

The digital-to-analog converter 78 converts the outbound baseband signals 96 from the digital domain to the analog domain. The filtering/gain module 80 filters and/or adjusts the gain of the analog signals prior to providing it to the IF mixing stage 82. The IF mixing stage 82 converts the analog baseband or low IF signals into RF signals based on a transmitter local oscillation 83 provided by local oscillation module 74. The power amplifier 84 amplifies the RF signals to produce outbound RF signals 98, which are filtered by the transmitter filter module 85. The antenna 86 transmits the outbound RF signals 98 to a targeted device such as a base station, an access point and/or another wireless communication device.

The radio 60 also receives inbound RF signals 88 via the antenna 86, which were transmitted by a base station, an access point, or another wireless communication device. The antenna 86 provides the inbound RF signals 88 to the receiver filter module 71 via the Tx/Rx switch 73, where the Rx filter 71 bandpass filters the inbound RF signals 88. The Rx filter 71 provides the filtered RF signals to low noise amplifier 72, which amplifies the signals 88 to produce an amplified inbound RF signals. The low noise amplifier 72 provides the amplified inbound RF signals to the IF mixing module 70, which directly converts the amplified inbound RF signals into an inbound low IF signals or baseband signals based on a receiver local oscillation 81 provided by local oscillation module 74. The down conversion module 70 provides the inbound low IF signals or baseband signals to the filtering/gain module 68. The filtering/gain module 68 filters and/or gains the inbound low IF signals or the inbound baseband signals to produce filtered inbound signals.

The analog-to-digital converter 66, which may be clocked via the digital clock 102, converts the filtered inbound signals from the analog domain to the digital domain to produce inbound baseband signals 90, where the inbound baseband signals 90 will be digital base-band signals or digital low IF signals, where the low IF typically will be in the frequency range of one hundred kilohertz to a few megahertz. The digital receiver processing module 64 decodes, descrambles, demaps, and/or demodulates the inbound baseband signals 90 to recapture inbound data 92 in accordance with the particular wireless communication standard being implemented by radio 60. The host interface 62 provides the recaptured inbound data 92 to the host device 18-32 via the radio interface 54.

As one of ordinary skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
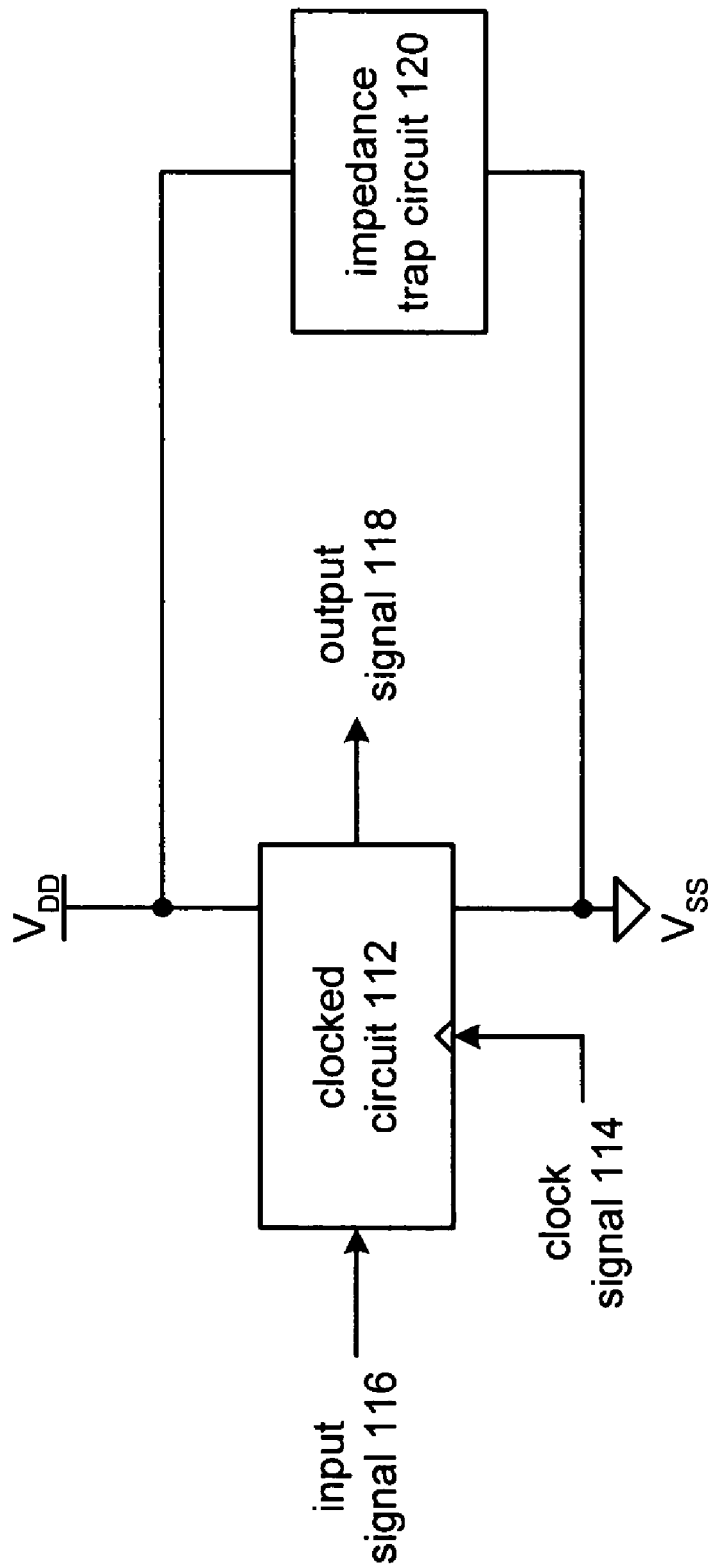
FIG. 3 is a schematic block diagram of a low noise circuit in accordance with the present invention.

FIG. 3 is a schematic block diagram of a low noise circuit 110 that includes a clocked circuit 112 and an impedance trap circuit 120. The clock circuit 112, which may be the analog to digital conversion module 66, the clock generating circuit 100, or other circuit within the radio 60, includes an input, an output, and a clock input. The input is operably coupled to receive an input signal 116 and the clock input is operably coupled to receive a clock signal 114. The clocked circuit 112 generates an output signal 118 based on the input signal 116 at intervals of the clock signal 114.

The impedance trap circuit 120 is operably coupled to the power supply connection ($V_{dd}$) and the power return connection ($V_{ss}$) of the clocked circuit 112. In one embodiment, the impedance trap circuit attenuates a harmonic signal component of at least one of the input signal, the clock signal, and the output signal. For example, if the clock signal is an 80 MHz clock, the input signal is an input of the analog to digital converter 66, and the inbound RF signals has a frequency of 2.4 GHz, the impedance trap circuit 120 is tuned to provide a low impedance at 2.4 GHz, which is the 30$^{th}$ harmonic of the 80 MHz clock signal.

Figure 4:
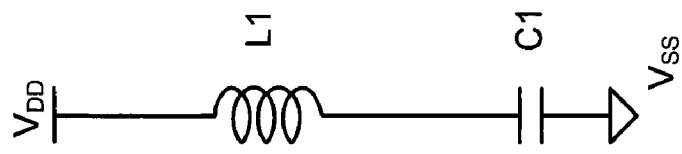

FIG. 4 is a schematic block diagram of an embodiment of the impedance trap circuit 120 that includes a capacitor C1 and an inductor L1. The resonate frequency of the capacitor C1 and the inductor L1 is tuned to provide a low impedance at a harmonic of a noise source. For example, the resonate frequency of the capacitor and the inductor may be tuned to 2.4 GHz or 5 GHz.

Figure 5:
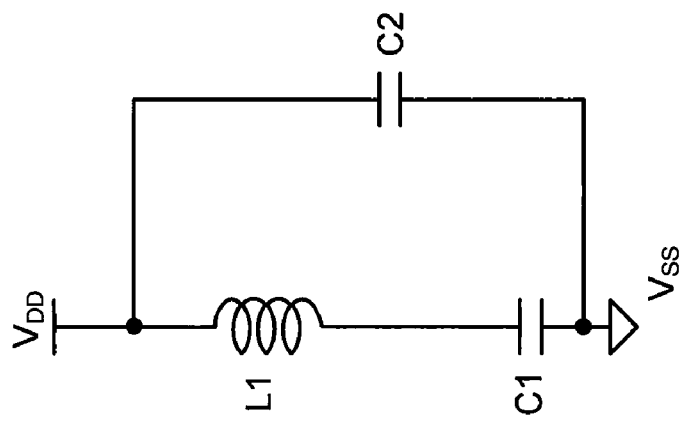

FIG. 5 is a schematic block diagram of an embodiment of the impedance trap circuit 120 that includes a capacitor C1, an inductor L1, and a second capacitor C2. The resonate frequency of the capacitor C1 and the inductor L1 is tuned to provide a low impedance at a harmonic of a noise source. For example, the resonate frequency of the capacitor and the inductor may be tuned to 2.4 GHz or 5 GHz. The capacitance of the second capacitor is selected to provide a low pass filter having corner frequency less than the resonate frequency of the series capacitor and inductor.

Figure 6:
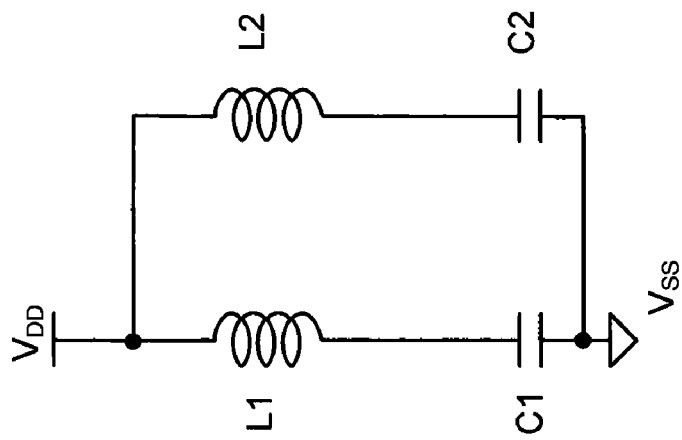
FIGS. 4-6 are schematic block diagrams of various embodiments of an impedance trap circuit in accordance with the present invention.

FIG. 6 is a schematic block diagram of an embodiment of the impedance trap circuit 120 that includes a capacitor C1, an inductor L1, a second capacitor C2, and a second inductor L2. The resonate frequency of the capacitor C1 and the inductor L1 is tuned to provide a low impedance at a harmonic of a noise source. For example, the resonate frequency of the capacitor and the inductor may be tuned to 2.4 GHz. The resonate frequency of the second capacitor C2 and the second inductor L2 is tuned to provide a low impedance at a harmonic of a noise source. For example, the resonate frequency of the capacitor and the inductor may be tuned to 5 GHz.

Figure 7:
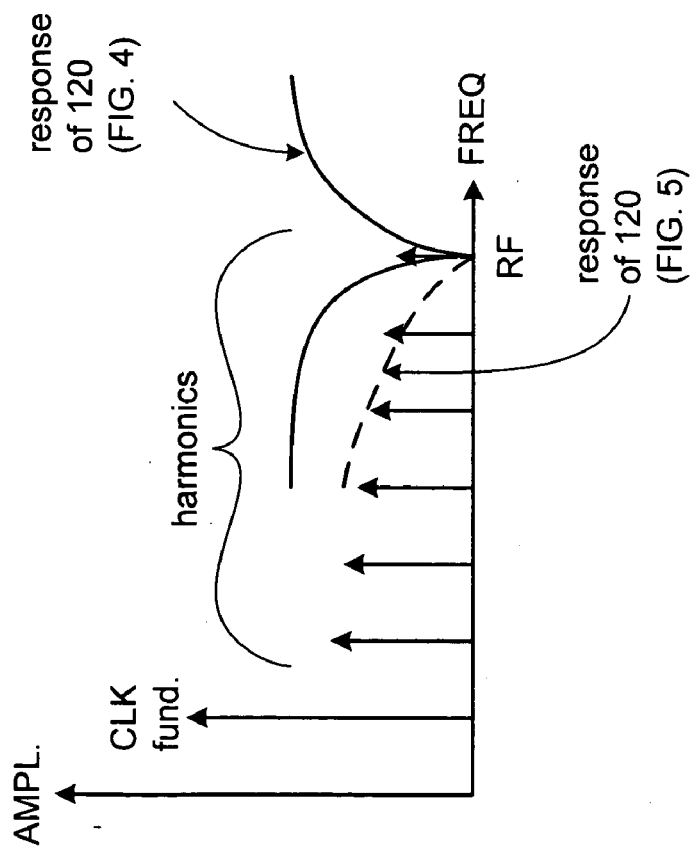
FIG. 7 is a diagram of a frequency response of the impedance trap circuits of FIGS. 4 and 5.

FIG. 7 is a diagram of a frequency response of the impedance trap circuits of FIGS. 4 and 5. In this diagram, a fundamental frequency and harmonics of a clock signal is shown. As is further shown, one of the harmonics of the clock signal occurs at a frequency corresponding to a radio frequency of interest. To reduce the adverse affects of the harmonic component at the radio frequency, the impedance trap circuit 120 is tuned to have a low impedance at the radio frequency. In the embodiment of FIG. 4, the frequency response is shown by the solid line. The dash line represents the frequency response of the embodiment of the impedance trap circuit of FIG. 5.

Figure 8:
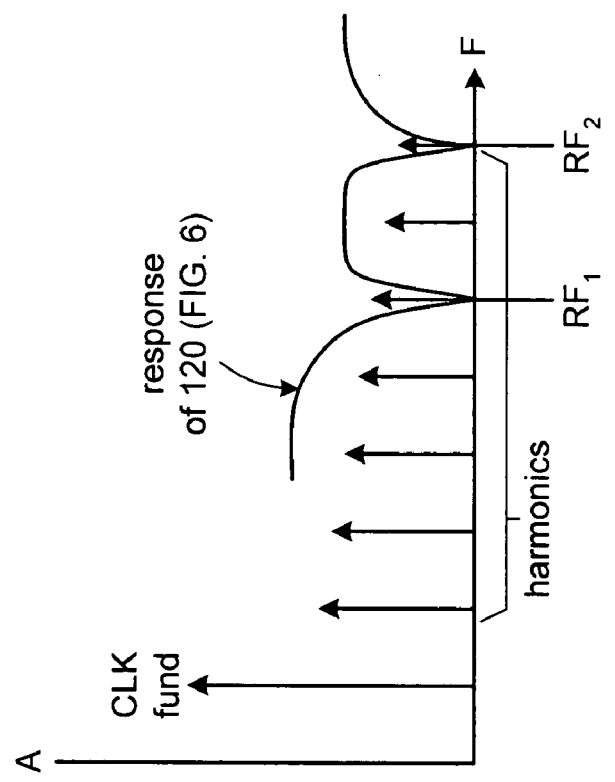
FIG. 8 is a diagram of a frequency response of the impedance trap circuits of FIG. 6.

FIG. 8 is a diagram of a frequency response of the impedance trap circuits of FIG. 6. In this diagram, a fundamental frequency and harmonics of a clock signal is shown. As is further shown, two of the harmonics of the clock signal occur at frequencies corresponding to radio frequencies of interest. To reduce the adverse affects of the harmonic component at the radio frequencies, the impedance trap circuit 120 is tuned to have a low impedance at the radio frequencies as shown by the frequency response of the impedance trap circuit.

Figure 9:
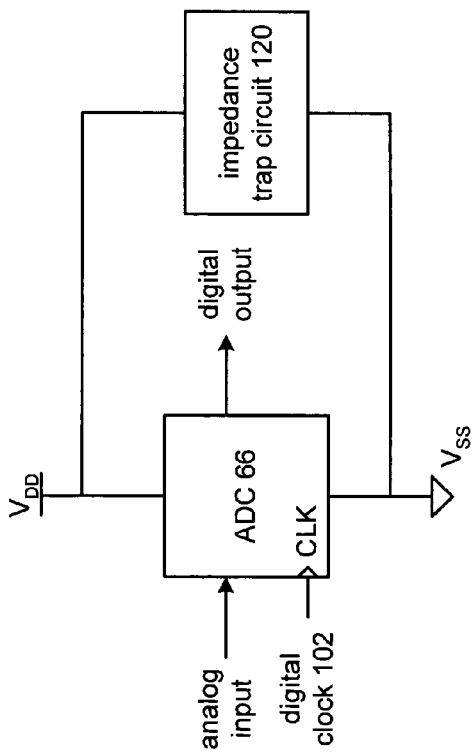
FIG. 9 is a schematic block diagram of an analog to digital conversion module in accordance with the present invention.

FIG. 9 is a schematic block diagram of an analog to digital conversion module 66 coupled to an impedance trap module 120. The analog to digital conversion module 66 includes an analog input, a digital output, a clock input, a power supply connection, and a power supply return connection. The analog input is operably coupled to receive an analog input signal, such as an analog baseband signal received from the filtering/gain module 68. The clock input is operably coupled to receive the digital clock 102 and the output provides a digital output such as the inbound baseband signals 90. The impedance trap module 120 is operably coupled to the power supply connection ($V_{DD}$) and the power supply return ($V_{SS}$).

Figure 10:
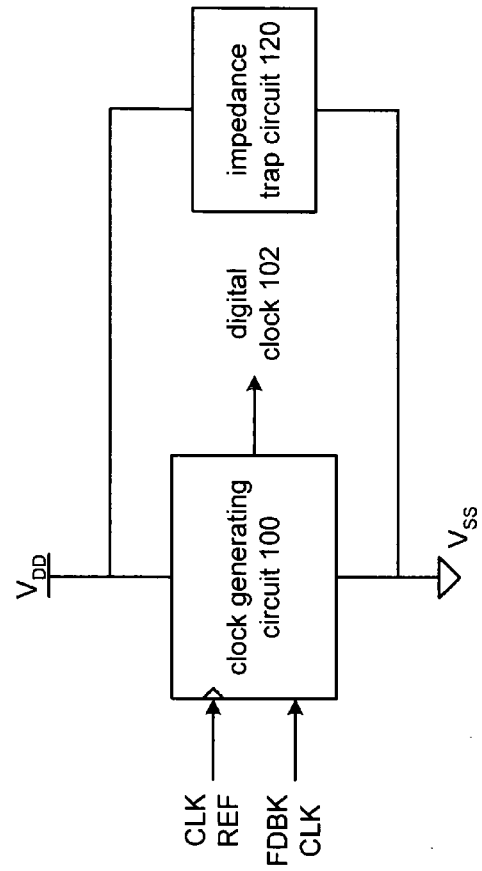
FIG. 10 is a schematic block diagram of a digital clock generating circuit in accordance with the present invention.

FIG. 10 is a schematic block diagram of a digital clock generating circuit 100 operably coupled to an impedance trap circuit 120. The digital clock generating circuit 100 includes an input, an output, a clock input, a power supply connection, and a power supply return connection. The input is operably coupled to receive a feedback clock, such as the output of a feedback divider module of a phase locked loop. The clock input is operably coupled to receive a reference clock and the output provides the digital clock 102. The impedance trap module 120 is operably coupled to the power supply connection ($V_{DD}$) and the power supply return ($V_{SS}$).

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented various embodiments of impedance trap circuit to attenuate harmonics of a noise source at frequency of interest. As one of ordinary skill in the art will appreciate, other embodiments of the present invention may be derived from the teachings of the present invention without deviating from the scope of the claims.

What is claimed is:

1. A low noise circuit comprises:
    a clocked circuit having a clock input, an input, an output, a power supply connection, and a power return connection, wherein the clock input is operably coupled to receive a clock signal, wherein the clocked circuit provides an output signal at the output based on an input signal at the input and a transition of the clock signal, and wherein the power supply connection is operably coupled to a power supply and the power return is operably coupled to a circuit ground; and
    an impedance trap circuit operably coupled to the power supply connection and the power return connection, wherein the impedance trap circuit attenuates a harmonic signal component of at least one of the input signal, the clock signal, and the output signal.

2. The low noise circuit of claim 1, wherein the impedance trap circuit comprises:
    a capacitor having a first plate and a second plate; and
    an inductor having a first node and a second node, wherein the first node of the inductor is coupled to the power supply connection, the second node of the inductor is coupled to the first plate of the capacitor, and the second plate of the capacitor is coupled to the power return connection, and wherein the capacitor and inductor resonate at a frequency corresponding to the harmonic signal component.

3. The low noise circuit of claim 2, wherein the impedance trap circuit further comprises:

a second capacitor having a first plate and a second plate; and a second inductor having a first node and a second node, wherein the first node of the second inductor is coupled to the power supply connection, the second node of the second inductor is coupled to the first plate of the second capacitor, and the second plate of the second capacitor is coupled to the power return connection, and wherein the second capacitor and second inductor resonate at a frequency corresponding to a second harmonic signal component of the output signal.

4. The low noise circuit of claim 2, wherein the impedance trap circuit further comprises:

a second capacitor coupled in parallel to the capacitor and the inductor.

5. The low noise circuit of claim 1, wherein the clocked circuit comprises:

an analog to digital converter (ADC), wherein the input of the ADC receives an analog signal and the output provides a digital signal.

6. The low noise circuit of claim 1, wherein the clocked circuit comprises:

a clock generating circuit, wherein the clock input is operably coupled to receive a reference clock signal, wherein the input is operably coupled to receive a feedback clock signal, and wherein the output provides an output clock signal.

7. A radio frequency (RF) receiver comprises:

a low noise amplifier operably coupled to amplify inbound RF signals to produce amplified inbound RF signals;

a down conversion module operably coupled to convert the amplified inbound RF signals into inbound baseband signals based on a local oscillation;

an analog to digital conversion module operably coupled to convert the inbound baseband signals into digital baseband signals;

a baseband processing module operably coupled to convert the digital baseband signals into inbound data, wherein the baseband processing module is clocked by a digital clock; and an impedance trap circuit operably coupled to a power supply connection and a power return connection of the analog to digital conversion module, wherein the impedance trap circuit attenuates a harmonic signal component of the digital clock, wherein the harmonic signal component is in a frequency range of the inbound RF signals.

8. The RF receiver of claim 7, wherein the impedance trap circuit comprises:

a capacitor having a first plate and a second plate; and an inductor having a first node and a second node, wherein the first node of the inductor is coupled to the power supply connection, the second node of the inductor is coupled to the first plate of the capacitor, and the second plate of the capacitor is coupled to the power return connection, and wherein the capacitor and inductor resonate at a frequency corresponding to the harmonic signal component.

9. The RF receiver of claim 8, wherein the impedance trap circuit further comprises:

a second capacitor having a first plate and a second plate; and a second inductor having a first node and a second node, wherein the first node of the second inductor is coupled to the power supply connection, the second node of the second inductor is coupled to the first plate of the second capacitor, and the second plate of the second capacitor is coupled to the power return connection, and wherein the second capacitor and second inductor resonate at a frequency corresponding to a second harmonic signal component of the output signal.

10. The RF receiver of claim 8, wherein the impedance trap circuit further comprises:

a second capacitor coupled in parallel to the capacitor and the inductor.

11. A radio frequency integrated circuit (RFIC) comprises:

a receiver section operably coupled to convert inbound radio frequency (RF) signals into inbound digital baseband signals based on a receiver local oscillation;

a transmitter section operably coupled to convert outbound digital baseband signals into outbound RF signals based on a transmitter local oscillation;

a local oscillation generation module operably coupled to produce the receiver local oscillation and the transmitter local oscillation;

baseband processing module operably coupled to convert the inbound digital baseband signals into inbound data and to convert outbound data into the outbound digital baseband signals, wherein the baseband processing module is clocked by a digital clock;

a digital clock circuit operably coupled to produce the digital clock from a reference clock signal; and an impedance trap circuit operably coupled to a power supply connection and a power return connection of the digital clock circuit, wherein the impedance trap circuit attenuates a harmonic signal component of the digital clock, wherein the harmonic signal component is in a frequency range of the inbound RF signals and the outbound RF signals.

12. The RFIC of claim 11, wherein the impedance trap circuit comprises:

a capacitor having a first plate and a second plate; and an inductor having a first node and a second node, wherein the first node of the inductor is coupled to the power supply connection, the second node of the inductor is coupled to the first plate of the capacitor, and the second plate of the capacitor is coupled to the power return connection, and wherein the capacitor and inductor resonate at a frequency corresponding to the harmonic signal component.

13. The RFIC of claim 12, wherein the impedance trap circuit further comprises:

a second capacitor having a first plate and a second plate; and a second inductor having a first node and a second node, wherein the first node of the second inductor is coupled to the power supply connection, the second node of the second inductor is coupled to the first plate of the second capacitor, and the second plate of the second capacitor is coupled to the power return connection, and wherein the second capacitor and second inductor resonate at a frequency corresponding to a second harmonic signal component of the output signal.

14. The RFIC of claim 12, wherein the impedance trap circuit further comprises:

a second capacitor coupled in parallel to the capacitor and the inductor.

* * * * *